Patented Aug. 27, 1940

2,213,139

UNITED STATES PATENT OFFICE 2,213,139

INCREASING THE WETTING POWER OF STRONG ALKALINE LYES

Richard Huttenlocher, Greiz, Germany, assignor to the firm Zschimmer & Schwarz Chemische Fabrik Dölau, Greiz-Dolau, Germany No Drawing. Application October 4, 1937, Serial No. 167,324. In Germany October 3, 1936

6 Claims. (Cl. 8—127)

(Granted under the provisions of sec. 14, act of March 2, 1927; 357 O. G. 5)

This invention relates to a process of increasing the wetting power of strong alkaline lyes. Strong alkaline lyes are used in the textile industry for the mercerizing of cotton, that is for passing the latter through caustic alkali lyes, and for the alkaline treatment of mixed fabrics and textiles made from natural and regenerated cellulose. In order to increase the wetting power of baths used for such alkaline treatment at the present time there are used mostly products containing phenol or cresol, which products, although producing an excellent wetting effect, are possessed of great disadvantages in other respects. Thus, the strong cresol odor inherent to these products is liable to molest the workmen employed in industrial plants of this kind. In addition to this, the cresol discharged with the waste-waters will come into rivers and brooks, which are thus poisoned over large distances.

There is, therefore, in connection with the treatment of strong alkaline lyes an actual demand for wetting agents which on the one hand are free of cresol and equivalent to cresol containing products as regards wetting and shrinking power, and on the other hand do not possess the objectionable strong odor liable to molest the consumers and to produce difficulties as regards the waste-waters.

Now, I have found that mixtures of substituted benzyl alcohols with alcohols are able to effect an increase of the wetting and permeating power of strong alkaline lyes to an extent equal to the best cresol products available in commerce. Besides, these mixtures are almost without odor, depending upon the kind of alcohol employed, and do not produce any difficulties in connection with the waste-waters.

As substituted benzyl alcohols may be used such benzyl alcohols, which contain at least one hydroxy group besides an alkyl group or one second alcohol group, for example hydroxy alkylbenzyl alcohols such as hydroxy methylbenzyl alcohol, hydroxy ethylbenzyl alcohol, hydroxy propylbenzyl alcohol, hydroxy isopropylbenzyl alcohol, hydroxy butylbenzyl alcohol, and ortho-, meta- and para-xylylene glycols. As alcohols may be added preferably aliphatic alcohols such as ethyl alcohol, propyl alcohol, butyl alcohol, glycol, glycerine; furthermore may be employed as alcohols monoethers of glycol and glycerine such as ethylene glycol monoethyl ether, propylene glycol monoethyl ether, butylene glycol monoethyl ether, ethylene glycol monopropyl ether, propylene glycol monopropyl ether, butylene glycol monopropyl ether, ethylene glycol monobutyl ether, propylene glycol monobutyl ether, butylene glycol monobutyl ether, glycerine monoethyl ether, glycerine monopropyl ether, glycerine monobutyl ether, glycerine diethyl ether, trimethylene glycol monoethyl ether.

For example, the following mixtures have proven to be especially advantageous:

A mixture consisting of about 90 parts of hydroxy methylbenzyl alcohol and 10 parts of ethylene glycol monoethyl ether or a mixture consisting of 85 parts of xylylene glycol and 15 parts of ethylene glycol monobutyl ether.

The higher alcohols or glycol and glycerine ethers with free hydroxyl groups are superior to the lower alcohols for the reason that they are possessed of high boiling points and small vapor pressure. Alkaline baths containing such ingredients, therefore, are subject to ageing to a far smaller extent as if made with ethyl, propyl or similar alcohols, although their wetting power in fresh baths is about the same in either case.

I claim:

1. A wetting agent for use in alkaline mercerizing solutions consisting of a mixture of an aliphatic alcoholic compound and a benzylalcohol substituted by a hydroxyalkyl radical containing up to and including four carbon atoms.

2. A wetting agent for use in alkaline mercerizing solutions consisting of a mixture of an aliphatic alcoholic compound and a substituted benzylalcohol containing a further hydroxy group and an alkyl radical containing up to and including four carbon atoms.

3. A wetting agent for use in alkaline mercerizing solutions consisting of a mixture of an aliphatic alcoholic compound and a xylylene glycol.

4. Alkaline mercerizing solutions of high wetting power, containing as the essential wetting agent a mixture which consists of an aliphatic alcoholic compound and a benzylalcohol substituted by a hydroxyalkyl radical containing up to and including four carbon atoms.

5. Alakaline mercerizing solutions of high wetting power, containing as the essential wetting agent a mixture which consists of an aliphatic alcoholic compound and a substituted benzylalcohol containing a further hydroxy group and an alkyl radical containing up to and including four carbon atoms.

6. Alkaline mercerizing solutions of high wetting power, containing as the essential wetting agent, a mixture which consists of an aliphatic alcoholic compound and a xylylene glycol.

RICHARD HUTTENLOCHER.